(12) United States Patent
Meguro et al.

(10) Patent No.: US 6,623,849 B2
(45) Date of Patent: Sep. 23, 2003

(54) MAGNETIC RECORDING MEDIUM

(75) Inventors: Katsuhiko Meguro, Kanagawa (JP); Hiroshi Hashimoto, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 281 days.

(21) Appl. No.: 09/866,091

(22) Filed: May 25, 2001

(65) Prior Publication Data

US 2002/0018914 A1 Feb. 14, 2002

(30) Foreign Application Priority Data

May 25, 2000 (JP) ........................................ 2000-154623

(51) Int. Cl.$^7$ .............................................. G11B 5/702
(52) U.S. Cl. ..................... 428/328; 428/329; 428/336; 428/500; 428/694 BA; 428/694 BH; 428/694 BG; 428/694 BC
(58) Field of Search ................................. 428/328, 329, 428/336, 500, 694 BS, 694 BA, 694 BH, 694 BG, 694 BC, 900

(56) References Cited

FOREIGN PATENT DOCUMENTS

DE   44 44927 A 1   *   6/1995

* cited by examiner

*Primary Examiner*—Stevan A. Resan
(74) *Attorney, Agent, or Firm*—Stroock & Stroock & Lavan LLP

(57) ABSTRACT

A magnetic recording medium comprises: a support; an underlayer containing a non-magnetic powder and a binder; and at least one magnetic layer containing a binder and one of a ferromagnetic metal powder having an average major axis of 0.01 $\mu$m to 0.10 $\mu$m and a crystallite size of 80 Å to 180 Å and a ferromagnetic hexagonal ferrite powder having an average tabular diameter of 5 nm to 40 nm, wherein the magnetic layer has a thickness of 0.01 $\mu$m to 0.5 $\mu$m, and the binder in the magnetic layer comprises a (meth)acrylate copolymer having hydrophilic polar groups and comprising 0 to 75% by weight of alkyl (meth)acrylate units, 5 to 80% by weight of benzene ring-containing (meth)acrylate units and 1 to 75% by weight of nitrogen-containing radical polymerizable monomer units.

12 Claims, No Drawings

MAGNETIC RECORDING MEDIUM

FIELD OF THE INVENTION

The present invention relates to a magnetic recording medium having excellent electromagnetic characteristics and running durability, which comprises a support having provided thereon an underlayer (i.e., lower layer) comprising a nonmagnetic powder and a binder and provided on the underlayer, a magnetic layer comprising a ferromagnetic powder and a binder, wherein the binder of the magnetic layer comprises a (meth)acrylate copolymer.

BACKGROUND OF THE INVENTION

As magnetic recording media comprising a support having provided thereon a magnetic layer containing as a binder a (meth)acrylate copolymer, there are known those described below.

In the present specification, the term "(meth)acrylate" means and includes both acrylate and methacrylate, the term "(meth)acrylamide" means and includes both acrylamide and methacrylamide, and the term "(meth) acrylic" means and includes both acrylic and methacrylic.

The magnetic recording medium disclosed in JP-A-4-176016 (the term "JP-A" as used herein means an "unexamined published Japanese patent application") contains as a binder for the magnetic layer a combination of a polyurethane resin and an acrylic resin containing polar groups and having a molecular weight of 1,000 to 10,000. Examples of the polar groups recited therein include hydroxyl groups and sulfonic acid (or sulfonate) groups, and examples of monomers for forming the skeleton of the acrylic resin as recited therein include saturated aliphatic esters of (meth)acrylic acid, ester linkage-dominated oligoester acrylates, urethane acrylates having a polyurethane main chain, and epoxy acrylates having an epoxy resin skeleton. However, no specific description on the skeleton and composition of the resin is made. Although the effects of the molecular weight of the acrylic resin and the species and content of the polar groups upon the dispersibility of the resin have been considered, no account is taken into the influence of the resin skeleton on the dispersibility. Therefore, there is no other choice but to understand that such a resin cannot ensure satisfactory dispersibility of superfine magnetic powder used for latest magnetic recording media.

The magnetic recording medium disclosed in JP-A-6-111279 contains as a binder for its magnetic coating a mixture of a polymethacrylic resin and a polyurethane resin. There is the description that the polymethacrylic resin can be synthesized by copolymerizing a methacrylic acid ester, an unsaturated monomer having a —R—OH group, a monomer having a —(O)SO$_3$X group and other copolymerizable unsaturated monomers. As examples of the methacrylic acid ester, esters formed from methacrylic acid and saturated aliphatic alcohol containing 1 to 5 carbon atoms are described. In addition, specific examples of the copolymerizable unsaturated monomers are recited, but methacrylic acid esters are not described therein. Polymethacrylic resins prepared by copolymerization of a methacrylic acid ester formed from methacrylic acid and a saturated aliphatic alcohol containing 1 to 5 carbon atoms, an unsaturated monomer having a —R—OH group, a monomer having a —(O)SO$_3$X group and a copolymerizable unsaturated monomer other than methacrylic acid ester are insufficient for dispersibility of superfine magnetic particles used in latest magnetic recording media.

The magnetic recording medium disclosed in JP-A-7-220263 contains as a main binder for its magnetic layer an acrylic copolymer comprising a monomer containing ether bonds, a polar group-containing monomer and an acrylic monomer. In JP-A-7-220263, as examples of the acrylic monomer, various acrylic monomers containing a benzene ring or a nitrogen atom are recited. As to the combined use of such acrylic monomers, only the description that they may be used in combination is made, and there is neither example using them in combination nor description on any positive effect of the combined use thereof. More specifically, an acrylic acid ester is not an essential component in the acrylic copolymers of JP-A-7-220263, and beside, the acrylic copolymers used in the examples do not contain as their constituent monomers any benzene ring- and nitrogen-containing acrylic monomers. As the benzene ring-containing copolymerizable monomer, only styrene is utilized in the acrylic copolymers of the examples. However, effect brought about by styrene is insufficient.

The magnetic recording medium disclosed in JP-A-8-67855 contains as a binder for its magnetic layer a copolymer of an acid group-containing monomer, a styrene monomer and/or a (meth)acrylic acid ester. The (meth)acrylic acid esters exemplified in JP-A-8-67855 include those containing nitrogen atoms, but those containing benzene rings are not included therein. The dispersibility of such a copolymer is still insufficient.

The magnetic recording medium disclosed in JP-A-8-180366 contains a (meth)acrylic copolymer synthesized by copolymerizing a radical-polymerizable monomer having a heterocyclic group containing oxygen and nitrogen atoms in the ring thereof and a radical-polymerizable monomer having a hydroxyl group and a sulfonic acid group. As an example of the (meth)acrylic monomer usable therein, a monomer containing benzene ring and nitrogen atom is also recited. The magnetic powder used in the examples is cobalt-γ-iron oxide. Although the copolymer containing as the essential component, styrene which has a benzene ring is described in JP-A-8-180366, it is insufficient for dispersing fine ferromagnetic metal powder having an average major axis of at most 0.1 μm or ferromagnetic hexagonal ferrite powder having an average tabular diameter of at most 40 nm used in very thin layer-coated magnetic recording media designed for the latest MR (magneto resistive) heads. As a result, the copolymer described cannot ensure the magnetic recording medium necessary electromagnetic characteristics and surface properties.

Further, the description of an average major axis of magnetic powder cannot be found in any literature except JP-A-8-67855. such being the case, the copolymers hitherto known as binders have insufficient effects on dispersibility of ferromagnetic metal powder having an average major axis of at most 0.1 μm or a ferromagnetic hexagonal ferrite powder having an average tabular diameter of at most 40 nm which is applicable to very thin layer-coated magnetic recording media designed for the latest MR heads, and so cannot ensure necessary electromagnetic characteristics and surface properties.

SUMMARY OF THE INVENTION

Therefore, an object of the invention is to ensure outstanding electromagnetic characteristics and running durability in a magnetic recording medium comprising a support provided thereon an underlayer containing a non-magnetic powder and a binder and further on the underlayer at least one magnetic layer containing a ferromagnetic powder and a binder.

Another object of the invention is to provide a magnetic recording medium capable of keeping high output and having a flat and smooth surface and a low error rate.

More specifically, the object of the invention is to provide the following magnetic recording media (1) to (4) by forming on a support an underlayer comprising a non-magnetic powder, further forming on the underlayer a magnetic layer having a thickness of 0.01 µm to 0.5 µm and comprising a ferromagnetic metal powder having an average major axis of 0.01 µm to 0.10 µm and a crystallite size of 80 to 180 Å or a ferromagnetic hexagonal ferrite powder having an average tabular diameter of 5 nm to 40 nm, and using as a binder for the magnetic layer a (meth)acrylate copolymer having hydrophilic polar groups and comprising benzene ring-containing (meth)acrylate units and nitrogen-containing radical polymerizable monomer units, and if necessary, alkyl (meth)acrylate units.

(1) A magnetic recording medium provided with a magnetic layer containing a ferromagnetic powder in a highly dispersed state and having excellent electromagnetic characteristics.

(2) A magnetic recording medium provided with a magnetic layer having high smoothness and improved electromagnetic characteristics.

(3) A magnetic recording medium provided with a magnetic layer which is highly resistant to surface abrasion, significantly reduces head contamination, and has excellent running durability.

(4) A magnetic recording medium having improved storage stability under high temperature and high humidity.

The objects of the invention are attained by a magnetic recording medium comprising a support having thereon an underlayer containing a non-magnetic powder and a binder and on the underlayer at least one magnetic layer containing a binder and a ferromagnetic metal powder having an average major axis of 0.01 to 0.10 µm and a crystallite size of 80 to 180 Å or a ferromagnetic hexagonal ferrite powder having an average tabular diameter of 5 to 40 nm, wherein the magnetic layer has a thickness of 0.01 to 0.5 µm and the binder contained in the magnetic layer comprises a (meth)acrylate copolymer having hydrophilic polar groups and containing 0 to 75% by weight of alkyl (meth)acrylate units, 5 to 80% by weight of benzene ring-containing (meth)acrylate units and 1 to 75% by weight of nitrogen-containing radical polymerizable monomer units.

DETAILED DESCRIPTION OF THE INVENTION

The invention includes the following preferred embodiments:

1. The magnetic recording medium wherein the magnetic layer has a thickness of 0.01 to 0.1 µm when it contains a ferromagnetic metal powder as defined above.

2. The magnetic recording medium wherein the magnetic layer has a thickness of 0.01 to 0.2 µm when it contains a ferromagnetic hexagonal ferrite powder as defined above.

3. The magnetic recording medium wherein the ferromagnetic metal powder contains Fe as a main component, and further contains Co, Al and Y in amounts of 10 to 40 atomic %, 2 to 20 atomic % and 1 to 15 atomic % respectively based on the Fe, and has a coercive force of 2,000 to 3,000 Oe (160 to 240 kA/m) and a saturated magnetic flux density of 150 to 300 mT.

4. The magnetic recording medium wherein the ferromagnetic hexagonal ferrite powder is a hexagonal barium ferrite having a coercive force of 2,000 to 3,000 Oe (160 to 240 kA/m) and a saturated magnetic flux density of 150 to 300 mT.

5. The magnetic recording medium wherein the (meth) acrylate copolymer having hydrophilic polar groups as defined above is contained in the underlayer also.

6. The magnetic recording medium which is formed into a magnetic disk or tape for recording digital signals by means of a record-reproducing system equipped with an MR reproduction head.

I. Binder

In the magnetic recording medium of the present invention, the binder for forming a magnetic layer and, if desired, an underlayer comprises a (meth)acrylate copolymer. The (meth)acrylate copolymer comprises 0 to 75% by weight of alkyl (meth)acrylate units, 5 to 80% by weight of benzene ring-containing (meth)acrylate units and 1 to 75% by weight of nitrogen-containing radical polymerizable monomer units and has hydrophilic polar groups.

Examples of the alkyl (meth)acrylate, which may be used in the invention include methyl (meth)acrylate, ethyl (meth) acrylate, propyl (meth)acrylate, butyl (meth)acrylate, isobutyl (meth)acrylate, pentyl (meth)acrylate, hexyl (meth) acrylate, octyl (meth)acrylate, 2-ethylhexyl (meth)acrylate, lauryl (meth)acrylate, stearyl (meth)acrylate and cyclohexyl (meth)acrylate. Of these, methyl (meth)acrylate is preferred. These monomers may be used alone or as a combination of two or more thereof. A proportion of these alkyl (meth) acrylate units is 0 to 75% by weight, preferably 0 to 70% by weight, most preferably 0 to 65% by weight, of the (meth) acrylate copolymer. When the proportion is higher than 75 mass %, on the other hand, the coating formed from the resulting copolymer has a reduced strength. The term "alkyl (meth)acrylate unit" means a polymeric section (moiety) of the copolymer that is formed by polymerizing the alkyl (meth)acrylate.

Examples of the benzene ring-containing (meth)acrylate used in the invention include benzyl (meth)acrylate, phenoxyethyl (meth)acrylate, phenoxypolyethylene glycol (meth)acrylate and nonylphenol-ethylene oxide adduct (meth)acrylate. Of these benzene ring-containing (meth) acrylates, benzyl (meth)acrylate and phenoxyethyl (meth) acrylate are preferred in particular. A proportion of the benzene ring-containing (meth)acrylate units is 5 to 80% by weight, preferably 10 to 75% by weight, most preferably 15 to 70% by weight, of the (meth)acrylate copolymer. When the proportion of these units is lower than 5% by weight, the resulting copolymer cannot ensure sufficient smoothness (glossiness) and durability of the coating layer, and besides, it has no effect of improving the dispersibility of magnetic powders. On the other hand, the proportion higher than 80% by weight causes an increase in viscosity of the coating composition. The term "benzene ring-containing (meth) acrylate unit" means a polymeric section (moiety) of the copolymer that is formed by polymerizing the benzene ring-containing (meth)acrylate.

Examples of the nitrogen-containing radical polymerizable monomer used in the intention include (meth) acrylamide, diacetone (meth)acrylamide, N-methylol (meth) acrylamide, N-methoxymethyl (meth)acrylamide, N-ethoxymethyl (meth) acrylamide, N-butoxymethyl (meth) acrylamide, dimethylaminopropyl (meth)acrylamide, dimethylaminomethyl (meth)acrylate, dimethylaminoethyl (meth)acrylate, diethylaminomethyl (meth)acrylate, diethylaminoethyl (meth)acrylate, dimethylaminopropyl (meth) acrylate, (meth)acryloyl morpholine, morpholinoethyl (meth)acrylate, N-vinyloxazolidone, N-vinyl-2-pyrrolidone, N-vinylcarbazole, 2-vinyl-4,6-diamino-5-triazine, 2-vinylpyridine, 4-vinylpyridine, maleimide, N-phenylmaleimide and acrylonitrile. A proportion of the nitrogen-containing radical polymerizable monomer units is 1 to 75% by weight, preferably 2 to 70% by weight, most preferably 5 to 65% by weight, of the copolymer. When the proportion of these units is lower than 1% by weight, the resulting copolymer has no effect of improving the dispersibility of magnetic powders. On the other hand, the proportion higher than 75% by weight causes deterioration in compatibility of the resulting copolymer with polyurethane resin. The term "nitrogen-containing radical polymerizable monomer unit" means a polymeric section (moiety) of the copolymer that is formed by polymerizing the nitrogen-containing radical polymerizable monomer.

Other monomers capable of copolymerizing with the above-recited alkyl (meth)acrylate, benzene ring-containing (meth)acrylate and nitrogen-containing radical polymerizable monomer may be used in synthesis of the (meth) acrylate copolymer according to the present invention. Examples of the copolymerizable monomer include alkyl vinyl ethers, such as allyl glycidyl ether, methyl vinyl ether, ethyl vinyl ether, isobutyl vinyl ether, n-butyl vinyl ether, 2-ethylhexyl vinyl ether, n-octyl vinyl ether, lauryl vinyl ether, cetyl vinyl ether and stearyl vinyl ether, alkoxyalkyl (meth)acrylates, such as methoxyethyl (meth)acrylate and butoxyethyl (meth)acrylate, glycidyl (meth)acrylate, vinyl acetate, vinyl propionate, maleic acid, maleic anhydride, acrylonitrile and vinylidene chloride. It is preferred that the proportion of the copolymerizable monomer units in the (meth)acrylate copolymer be at most 26% by weight. When the proportion of the copolymerizable monomer unit is beyond this range, the mechanical properties and dispersibility of the copolymer decrease.

The (meth)acrylate copolymer used in the invention has hydrophilic polar groups. Any hydrophilic polar groups may be contained in the copolymer as far as they can function so as to enhance dispersibility of fine ferromagnetic powder. Suitable examples of such hydrophilic polar groups include —$SO_3M$, —$PO(OM)_2$, —COOM (wherein M represents a hydrogen atom, an alkali metal or ammonium), an amino group and a quaternary ammonium base. Of these groups, —$SO_3H$ is preferred because it exhibits excellent effect on improvement of dispersibility. The content of hydrophilic polar groups is preferably from $1\times10^5$ to $50\times10^5$ eq. per gram of the binder, more preferably from $5\times10^{-6}$ to $20\times10^{-5}$ eq. per g of the binder. When the content is lower than $1\times10^{-6}$ eq. per gram of the binder, no effect can be obtained; while, when the content is higher than $50\times10^{-5}$ eq. per gram of the binder, the coating composition becomes to have such high viscosity that it undergoes serious deterioration in workability and becomes difficult to handle. The (meth) acrylate copolymer used in the invention may contain two or more kinds of hydrophilic polar groups. For instance, the copolymer used in the invention may contain —COOM groups in addition to —$SO_3M$ groups.

For the production of the (meth)acrylic copolymer having the hydrophilic polar groups according to the invention, a method of introducing the hydrophilic polar groups by a reaction between a hydrophilic polar group-containing compound and a hydrophilic polar group-free (meth)acrylate copolymer comprising alkyl (meth)acrylate units, benzene ring-containing (meth)acrylate units and nitrogen-containing radical polymerizable monomer units. For instance, introduction of —$SO_3M$ groups into a (meth) acrylate copolymer can be effected by firstly copolymerizing an alkyl (meth)acrylate, a benzene ring-containing (meth) acrylate, a nitrogen-containing radical polymerizable monomer and a copolymerizable monomer containing a glycidyl group, and other monomers copolymerizable with the monomers described above, if desired, and at the same time or subsequently thereto carrying out reaction with a compound containing —$SO_3M$ group and being reactive to the glycidyl group. Examples of the copolymerizable monomer containing a glycidyl group include glycidyl (meth)acrylate and allyl glycidyl ether. Such monomers may be used alone or as a combination of two or more thereof. Examples of the compound containing —$SO_3M$ group and being reactive to a glycidyl group include sulfurous acid and sulfites, such as sodium sulfite, sodium hydrogen sulfite, potassium sulfite and ammonium sulfite, sulfuric acid and hydrogen sulfates, such as sodium hydrogen sulfate, potassium hydrogen sulfate and ammonium hydrogen sulfate, and aminosulfonic acids, such as taurine, sodium taurine, potassium taurine, ammonium taurine, sulfamic acid, sodium sulfamate, potassium sulfamate, ammonium sulfamate, sulfanilic acid, sodium sulfanilate, potassium sulfanilate and ammonium sulfanilate.

On the other hand, a copolymerizable monomer containing a hydrophilic polar group may be copolymerized with an alkyl (meth)acrylate, a benzene ring-containing (meth) acrylate, a nitrogen-containing radical polymerizable monomer and other copolymerizable monomers to prepare the (meth)acrylic copolymer. Examples of the copolymerizable monomer used for introducing —$SO_3M$ as a hydrophilic polar group include unsaturated hydrocarbon sulfonic acid, such as 2-acrylamide-2-methylpropanesulfonic acid, vinylsulfonic acid, (meth)acrylsulfonic acid, p-styrenesulfonic acid, and salts thereof; and (meth)acrylic acid sulfoalkyl esters, such as (meth)acrylic acid sulfoethyl ester and (meth) acrylic acid sulfopropyl ester. When introduction of —COOM is required in addition to —$SO_3M$, a copolymerizable monomer containing —COOM, such as (meth)acrylic acid, maleic acid and salts thereof, can be used in the copolymerization reaction.

Further, the foregoing hydrophilic polar groups may be introduced into a (meth)acrylate copolymer by a method of copolymerizing the mixture of monomers using a radical polymerization initiator containing the hydrophilic polar group, or a method of copolymerizing a mixture of the monomers in the presence of a chain transfer agent having the hydrophilic polar group at one terminal.

Examples of the radical polymerization initiator containing a hydrophilic polar group include ammonium persulfate, potassium persulfate and sodium persulfate. An amount of the radical polymerization initiator used is ordinarily 1 to 10 mass %, preferably 1 to 5 mass %, based on the total amount of monomers used in the copolymerization.

The chain transfer agent having a hydrophilic polar group at one terminal is not particularly limited, so far as the agent enables chain transfer in the copolymerization reaction and has a hydrophilic polar group at one terminal. Such chain transfer agents include, for example, halogenated compounds, mercapto compounds and diphenylpicrylhydrazine, each of which has a hydrophilic polar group at one terminal. Examples of the halogenated compound include 2-chloroethanesulfonic acid, sodium 2-chloroethanesulfonate, 4-chlorophenylsulfoxide, 4-chlorobenzenesulfonamide, p-chlorobenzenesulfonic acid, sodium p-chlorobenzenesulfonate, sodium 2-bromoethanesulfonate, and sodium 4-(bromomethyl) benzenesulfonate. Of these compounds, sodium 2-chloroethanesulfonate and sodium p-chlorobenzenesulfonate are preferred. Suitable examples of the mercapto compound include 2-mercaptoethanesulfonic acid (salts) (wherein the expression (slats) as used herein is intended to include compounds having the salt form), 3-mercapto-1,2-propanediol, mercaptoacetic acid (salts), 2-mercapto-5-benzimidazolesulfonic acid (salts), 3-mercapto-2-butanol, 2-mercaptobutanol, 3-mercpato-2-propanol, N-(2-mercaptopropyl) glycine, ammonium thioglycollate and β-mercaptoethylamine hydrochloride. These chain transfer agents each having a hydrophilic polar group at one terminal, can be used alone or as a combination of two or more thereof. Of those chain transfer agents, highly polar 2-mercpatoethanesulfonic acid (salts) are preferred in particular. An amount of the chain transfer agent used is 0.1 to 10% by weight, preferably 0.2 to 5% by weight, based on the total amount of monomers used in the copolymerization.

In addition to —$SO_3M$ groups, it is also advantageous to introduce hydroxyl groups as hydrophilic polar groups into the copolymer by copolymerization with a hydroxyl group-containing monomer. Examples of the hydroxyl group-containing monomer include hydroxyalkyl (meth)acrylates, such as hydroxyethyl (meth)acrylate, hydroxypropyl (meth) acrylate, polyethylene glycol mono (meth)acrylate, polypropylene glycol mono (meth)acrylate, polyethylene glycol polypropylene glycol mono (meth)acrylate, glycerol mono (meth)acrylate and 3-chloro-2-hydroxypropyl (meth) acrylate, vinyl ethers, such as hydroxyethyl vinyl ether and hydroxybutyl vinyl ether, (meth)allyl ethers, such as hydroxyethyl mono (meth)allyl ether, hydroxypropyl mono (meth)allyl ether, hydroxybutyl mono (meth)allyl ether, diethylene glycol mono (meth)allyl ether, dipropylene glycol mono (meth)allyl ether, glycerol mono (meth)allyl ether and 3-chloro-2-hydroxypropyl (meth)allyl ether, and (meth) allyl alcohols. On the other hand, it is also possible to introduce vinyl alcohol-derived hydroxyl groups by copolymerization with vinyl acetate and subsequent saponification reaction with an alkali hydroxide in a solvent. An amount of the hydroxyl group-containing monomers is 1 to 30% by weight based on the total monomers to be copolymerized.

A number average molecular weight of the (meth)acrylate copolymer containing hydrophilic polar groups for use in the present invention is preferably from 1,000 to 300,000, more preferably from 10,000 to 150,000. When the copolymer used has a number average molecular weight of lower than 1,000, the magnetic coating obtained has inferior mechanical strength, e.g., becomes brittle. In such a case, therefore, the magnetic tape made cannot have high durability. When the copolymer has a number average molecular weight higher than 200,000, on the other hand, the coating composition having a prescribed copolymer concentration undergoes increase in viscosity, and causes severe decrease in workability and becomes difficult to handle.

To conduct polymerization in a reaction system comprising the foregoing polymerizable monomers and chain transfer agent, various known polymerization methods can be adopted. For instance, methods of suspension polymerization, emulsion polymerization and solution polymerization can be employed. Of these polymerization methods, suspension polymerization and emulsion polymerization which ensure ready drying operation are preferred. According to such methods, the storage of (meth)acrylate copolymer having hydrophilic polar groups can be easily made in a solid state which can ensure high keeping stability. In particular, emulsion polymerization is preferably used. The suitable polymerization conditions may vary depending on what kinds of polymerizable monomers, polymerization initiator and chain transfer agent are used. In general, however, it is preferred that the polymerization is conducted in an autoclave for about 5 to about 30 hours at a temperature of about 50 to about 80° C. under a gage pressure of about 4.0 to about 1.0 MPa. In addition, it is advantageous to carry out the polymerization in an atmosphere of gas inert toward the reaction in view of easiness of reaction control. Such gas includes, e.g., nitrogen or argon, but nitrogen is preferably used from the economical point of view. In carrying out the polymerization, ingredients other than the above-recited ones may be added to the polymerization reaction system. Examples of such ingredients include an emulsifier, an electrolyte and a high molecular protective colloid.

In the present invention, a polyurethane resin may be used as the binder together with the (meth)acrylate copolymer, if desired. It is favorable for such a polyurethane resin to contain the hydrophilic polar groups as described above. The polyurethane resin into which hydrophilic polar groups are introduced can be produced from a hydrophilic polar group-containing polyol, such as a hydrophilic polar group-containing polyesterpolyol, polycarbonatepolyol or polyetherpolyol, a hydrophilic polar group-free polyol, such as a hydrophilic polar group-free polyesterpolyol, polycarbonatepolyol or polyetherpolyol, and a diisocyanate. The hydrophilic polar group-containing polyol contains a hydrophilic polar group as described above in the main chain or side chain of polyol, and can be produced via a process of partly replacing a dihydric alcohol or dibasic acid as described below with a hydrophilic polar group-containing diol or dibasic acid respectively. Examples of the hydrophilic polar group-containing diol include ethylene oxide (EO) adduct of sulfoisophthalic or sulfoterephtalic acid (including sodium and potassium salts thereof), propylene oxide (PO) adduct of sulfoisophthalic or sulfoterephtalic acid (including sodium and potassium salts thereof), EO adducts of sulfamic acids, such as aminoethanesulfonic acid, and PO adducts of sulfamic acids. Examples of the hydrophilic polar group-containing dibasic acid include 5-sodiumsulfoisophthalic acid, 5-potassiumsulfoisophthalic acid, 5-sulfoisophthalic acid, 2-sodiumsulfoterephthalic acid, 2-potassiumsulfoterephthalic acid and 2-sulfoterephthalic acid.

The polyesterpolyol can be produced, e.g., by polycondensation of a dihydric alcohol and a dibasic acid, or ring-opening polymerization of a lactone, such as caprolactone. Typical examples of the dihydric alcohol include glycols, such as ethylene glycol, propylene glycol, butanediol, 1,6-hexanediol and cyclohexane dimethanol. Typical examples of the dibasic acid include adipic acid, pimelic acid, azelaic acid, sebacic acid, phthalic acid and terephthalic acid.

The polycarbonatepolyol includes polycarbonatepolyol produced from polyhydric alcohol and phosgene, chloroformic acid ester, dialkylcarbonate or diallylcarbonate by subjecting them to a condensation or transesterification reaction, which has a molecular weight of 300 to 20,000 and a hydroxyl number of 200 to 300, and polycarbonatepolyesterpolyol prepared by condensation of the foregoing polycarbonatepolyol and a dicarboxylic acid, which has a molecular weight of 400 to 30,000 and a hydroxyl number of 5 to 300.

As the polyetherpolyol can be used polyethylene oxide or polypropylene oxide adduct of bisphenol A, hydrogenated bisphenol A, bisphenol S or bisphenol P, and polyetherpolyol such as polypropylene glycol, polyethylene glycol or polytetramethylene glycol, having a molecular weight of 500 to 5,000. Of these polyetherpolyols, it is advantageous to use polyethylene oxide or polypropylene oxide adduct of bisphenol A or hydrogenated bisphenol A which contains ether groups in a proportion of 25 to 45% by weight, preferably 30 to 40% by weight. When the proportion is lower than 25% by weight, the polyurethane resin produced using such a polyetherpolyol may have reduced solubility in a solvent and causes deterioration in dispersibility. On the other hand, when the proportion is higher than 45% by weight, the polyurethane resin produced using such a polyetherpolyol may reduce film strength and cause deterioration in durability.

The polyols as recited above may be used together with other polyols. In this case, the other polyols may be mixed in an amount up to 90% by weight of the aforementioned polyols.

There are no particular restrictions as to the polyisocyanates used for producing polyurethane resins by reacting with the foregoing polyols, but any of commonly used polyisocyanates may be utilized. Examples thereof include hexamethylene diisocyanate, tolidine diisocyanate, isophorone diisocyanate, 1,3-xylylene diisocyanate, 1,4-xylylene diisocyanate, cyclohexane diisocyanate, toluidine diisocyanate, 2,4-tolylene diisocyanate, 2,6-tolylene diisocyanate, 4,4'-diphenylmethane diisocyanate, p-phenylene diisocyanate, m-phenylene diisocyanate, 1,5-naphthalene diisocyanate and 3,3-dimethylphenylene diisocyanate.

Known compounds such as polyhydric alcohols, aliphatic polyamines, alicyclic polyamines and aromatic polyamines can be used as chain lengthening agents. Of these compounds, polyhydric alcohols having a molecular weight of 50 to 500 are preferred. When the polyhydric alcohol used has a molecular weight lower than 50, the coating layer becomes brittle and the durability thereof is lowered. On the other hand, when the polyhydric alcohol used has a molecular weight higher than 500, the coating layer becomes low in Tg and the durability thereof is also lowered because of its softness. Suitable examples of the polyhydric alcohol include short-chain diols having cyclic structures, such as bisphenol A, hydrogenated bisphenol A, bisphenol S, bisphenol P, ethylene oxide adducts of these bisphenols, propylene oxide adducts of these bisphenols, cyclohexanedimethanol, cyclohexanediol, hydroquinone, bis(2-hydroxy-ethyl)tetrabromobisphenol A, bis(2-hydroxyethyl)tetrabromobisphenol S, bis(2-hydroxyethyl) diphenylbisphenol S, bis(2-hydroxyethyl) diphenylbisphenol, bis(2-hydroxyethyl) thiodiphenol, bis(2-hydroxyethyl)bisphenol F, biphenol, bisphenolfluorene and bisphenolfluorene dihydroxyethyl ether. Of these diols, aromatic diols and alicyclic diols, such as bisphenol A, hydrogenated bisphenol A, bisphenol S, bisphenol P, ethylene oxide adducts of these bisphenols, propylene oxide adducts of these bisphenols, cyclohexanedimethanol and cyclohexanediol, are preferred.

An average molecular weight of the hydrophilic polar group-containing polyurethane resin for use in the invention is from 5,000 to 100,000, preferably from 10,000 to 50,000. When the polyurethane resin used has an average molecular weight of lower than 5,000, the magnetic coating obtained has inferior mechanical strength, e.g., becomes brittle, and thereby the durability of a magnetic material obtained is adversely influenced. When the polyurethane resin used has an average molecular weight higher than 100,000, on the other hand, it has low solubility in a solvent and the dispersibility thereof is lowered. In addition, such a polyurethane resin increases viscosity of a coating composition when it is added to the composition in a prescribed concentration, and such a composition has poor workability and becomes difficult to handle.

As to hydroxyl groups contained in the hydrophilic polar group-containing polyurethane resin for use in the invention, it is advantageous in view of curability and durability that they are present in branched chains. A number of hydroxyl groups per molecule is preferably from 2 to 40, more preferably from 3 to 20.

When the hydrophilic polar group-containing polyurethane resin is used as one of binders for forming the magnetic layer and, if desired, the underlayer also, the amount thereof is preferably from 2 to 5,000 parts by weight per 100 parts by weight of the (meth)acrylate copolymer containing hydrophilic polar groups.

To the binder, a polyisocyanate can be added as a crosslinking agent to improve abrasion resistance of the magnetic layer. Examples of the polyisocyanate used as a crosslinking agent include isocyanates, such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate, reaction products of these isocyanates and polyalcohols, and polyisocyanates produced by condensation of isocyanates. Commercially available products of the isocyanates as described above include, e.g., Colonate L, Colonate ML, Colonate 2030, Colonate 2031, Millionate MR and Millionate MTL (trade names, produced by Nippon Polyurethane Industry Co., Ltd.), Takenate D-102, Takenate D-110N, Takenate D-200 and Takenate D-202 (trade names, produced by Takeda Chemical Industries, Ltd.), and Desmodur L, Desmodur IL, Desmodur N and Desmodur HL (trade names, produced by Sumitomo Bayer Co., Ltd.) These polyisocyanates may be used alone or as a combination of two or more thereof having a curing reactivity different from each other.

In addition to the aforementioned hydrophilic polar group-containing (meth)acrylate copolymer and polar group-containing polyurethane resin, other resins may also be used as the binder in the magnetic layer and underlayer. In general, an amount of the resin used together is smaller than the total amount of the foregoing (meth)acrylate copolymer and polyurethane resin. It is preferable for the resin used together to have hydrophilic polar groups. However, there is no particular restriction as to the resin used together, but any of resins hitherto used as binder, including known thermoplastic resins, thermosetting resins, reactive resins and mixtures thereof can be utilized. The thermoplastic resins usable as binder are those having their glass transition temperature in the range of −100 to 150° C. and their number average molecular weight in the range of 1,000 to 200,000, preferably 10,000 to 100,000. Specific examples thereof include polymers, copolymers and resins of various rubber each containing as constituent unit vinyl chloride, vinylidene chloride, acrylonitrile, styrene, butadiene, ethylene, vinyl butyral, vinyl acetal and/or vinyl ether. Examples of the thermosetting resins or reactive resins include phenol resin, phenoxy resin, epoxy resin, urea resin, melamine resin, alkyd resin, acrylic reactive resin, formaldehyde resin, silicone resin, epoxy-polyamide resin, and a mixture of polyester resin and isocyanate prepolymer.

II. Magnetic Materials

[Ferromagnetic Metal Powder]

The ferromagnetic metal powder used in the invention has no particular restrictions as far as it contains Fe (including Fe alloys) as a main component. However, ferromagnetic alloy powders containing α-Fe as their main component are preferred. Besides containing the specified atom, these ferromagnetic metal powders may contain Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr and B atoms. It is favorable to use a ferromagnetic metal powder containing α-Fe and at least one atom selected from Al, Si, Ca, Y, Ba, La, Nd, Co, Ni or B. In particular, a ferromagnetic metal powder containing α-Fe, Co, Al and Y is used to advantage. More specifically, the ferromagnetic metal powders containing Co, Al and Y in amounts of 10 to 40 atomic %, 2 to 20 atomic % and 1 to 15 atomic, respectively, based on the Fe are preferably used.

Prior to dispersion, those ferromagnetic metal powders maybe treated with a dispersing agent, a lubricant, a surfactant or/and an antistatic agent as described below. Further, the ferromagnetic metal powders may contain a slight amount of water, hydroxide or oxide. A water content in the ferromagnetic metal powder is preferably from 0.01 to 2%. However, it is desired that the water content be optimized depending on the species of binder used.

It is desirable for the ferromagnetic metal powder used in the invention to have a crystallite size of 80 to 180 Å, preferably 100 to 180 Å, particularly preferably 120 to 160 Å. As crystallite sizes smaller than 80 Å cause significant demagnetization and those greater than 180 Å result in increasing noises, the crystallite sizes out of those limits are undesirable. The crystallite size is denoted using an average values determined in accordance with the Scherrer method from half-widths of diffraction peaks measured using an X-ray diffraction instrument (RINT2000 series, made by Rigaku Corporation) under conditions that the X-ray source, tube voltage and tube current are CuKα1, 50 kV and 300 mA, respectively.

It is also desirable for the ferromagnetic metal powder used in the invention to have an average major axis of 0.01 to 0.10 μm, preferably 0.03 to 0.09 μm, particularly preferably 0.05 to 0.08 μm. When the powder used has an average major axis shorter than 0.01 μm, consistent magnetization cannot be achieved due to thermal fluctuations; while noises increase when it has an average major axis longer than 0.10 μm. Therefore, ferromagnetic metal powders having average major axes out of those limits are undesirable. The average major axis can be determined by taking transmission electron micrographs and directly reading widths and lengths of the ferromagnetic metal powder on the micrographs.

For a ferromagnetic metal powder used in the present magnetic layer, it is preferred to have a specific surface area of at least 30 m²/g and smaller than 50 m²/g, more preferably 38 to 48 m²/g, measured by BET method. Hereinafter, the specific surface area measured by BET method is abbreviated as "$S_{BET}$". By having its specific surface area in such a range, the ferromagnetic metal powder can ensure good surface properties and low noise.

It is advantageous that pH of the ferromagnetic metal powder be optimized depending on the binder used in combination therewith. The optimal pH range is ordinarily from 4 to 12, preferably from 7 to 10. In advance of use, the ferromagnetic metal powder may be subjected to surface treatment with Al, Si, P or an oxide of such an element, if desired. The suitable amount of such an element or oxide thereof used is 0.1 to 10% of the weight of the ferromagnetic metal powder to be subjected to the surface treatment. By the surface treatment, the adsorption of a lubricant such as fatty acid can be controlled to 100 mg/m² or below. The ferromagnetic metal powder used may contain soluble inorganic ions, such as Na, Ca, Fe, Ni and Sr ions. However, such ions have little effect on characteristics of the magnetic layer so far as their content is 200 ppm or below. Further, the use of a ferromagnetic metal powder having less pores is more, advantageous to the invention. A content of the pores is preferably 20 volume % or below, more preferably 5 volume % or below.

As to the particle shape, the ferromagnetic metal powder used in the invention may have any of acicular, granular and rice-grain shapes as far as it meets the foregoing particle size requirements. However, it is particularly advantageous to use an acicular ferromagnetic metal powder. In case of using the acicular ferromagnetic metal powder, it is preferred that the metal powder have an average aspect ratio (arithmetic mean of aspect ratios (length/width ratios)) of 4 to 12, more preferably 5 to 12.

For the ferromagnetic metal powder used, it is preferred to have a coercive force Hc of 2,000 to 3,000 Oe (160 to 240 kA/m), more preferably 2,100 to 2,900 Oe (170 to 230 kA/m), and a saturated magnetic flux density of 150 to 300 mT, more preferably 160 to 290 mT. A saturation magnetization σs is preferably from 140 to 170 A·m²/kg, more preferably from 145 to 160 A·m²/kg.

[Ferromagnetic Hexagonal Ferrite Powder]

When reproduction is performed with a resistance magnetic head for increasing a track density in particular, it is required to reduce noises. Therefore, the ferromagnetic hexagonal ferrite powder used in the invention is required to have an average tabular diameter of 40 nm or below. However, when the average tabular diameter is smaller than 5 nm, consistent magnetization cannot be expected due to thermal fluctuations. It is desirable that the ferrite powder has an average tabular diameter of 10 nm to 35 nm, preferably 15 nm to 30 nm.

It is preferred that the average tabular ratio (arithmetic mean of tabular ratios (diameter/thickness ratios of tabular particles)) is from 1 to 15, more preferably from 1 to 7. A small average tabular ratio is favorable to elevation of a packing degree in the magnetic layer, but cannot produce sufficient orientation effect. On the other hand, the average tabular ratio greater than 15 causes stacking of particles and results in increasing noises. The tabular particles have a specific surface area of 10 to 200 m²/g, determined by BET method, as far as their sizes are in the aforementioned range. The specific surface area corresponds roughly to a value calculated mathematically from the diameter and thickness values of individual tabular particles. In most cases, it is preferable that the diameter and thickness distributions of the tabular particles be narrower. The diameter and thickness measurements of tabular particles are made picking 500 particles on a particle TEM photograph. Although the distribution is not Gaussian distribution in most cases, the distribution factor calculated in terms of the ratio of standard deviation to average particle size, σ/average size, ranges from 0.1 to 2.0. For sharpening the particle size distribution, it is required not only to render the reaction system for particle formation as homogenous as possible but also to subject the formed particles to distribution-improving treatment. For example, there is known a method of dissolving superfine particles selectively in an acid solution.

It is possible to produce magnetic materials having coercive force Hc of the order of 500 to 5,000 Oe (40 kA/m to 400 kA/m). Although high Hc is advantageous to high-density recording, the upper limit of Hc is dependent on the performance of a recording head used. The suitable Hc for the invention is preferably of the order of 2,000–3,000 Oe (160–240 kA/m), more preferably from 2,200 to 2,800 Oe (175 to 220 kA/m). When the saturation magnetization of a head used is greater than 1.4 T, it is desirable for the magnetic material to have Hc of at least 2,000 Oe (160 kA/m). The Hc can be adjusted to the desired value by properly controlling particle sizes (diameter, thickness), species and contents of elements mixed, displacement sites of elements mixed and reaction conditions for particle formation. It is preferred that the saturation magnetization σs is adjusted to the range of 40 to 80 A·m²/kg. The higher σs is preferred, but there is a tendency that σs becomes lower as the particle size decreases. For improvement of σs, it is well known to combine magnet oplumbite ferrite with spinel ferrite, and properly select the species and amounts of elements mixed. In addition, it is also possible to use W-type hexagonal ferrite.

Before dispersing the magnetic material into a polymer, it is also carried out to treat the magnetic particle surface with a substance compatible with the dispersing medium to be used and the polymers. As the surface treatment agent, both inorganic and organic compounds can be used. Typical examples of such compounds include Si compounds, Al compounds, P compounds, various silane coupling agents and various titanium coupling agents. The amount of such compounds used is 0.1 to 10% of the weight of magnetic material treated. The pH of the magnetic material is also important for dispersion. The pH of the magnetic material is ordinarily about 4 to about 12, and the optimal value thereof may be varied depending on the dispersing medium and the polymer used together. However, the pH of about 6- to about 11 is selected from the viewpoints of chemical stability and preservability of the medium. The dispersion is also influenced by the amount of water contained in the magnetic material. Although the optimal water content may be varied depending on the dispersing medium and polymer used, it is ordinarily chosen from the range of 0.01 to 2.0%.

The following are methods for production of the ferromagnetic hexagonal ferrite powders:

(1) A glass crystallization method comprising steps of mixing barium oxide, iron oxides, oxides of metals to displace iron and a glass forming material in amounts enabling the production of ferrite having the desired composition, melting the mixture, quenching the molten mixture to form an amorphous matter, and further subjecting the amorphous matter to successive annealing, washing and grinding operations, thereby producing a barium ferrite crystalline powder.

(2) A hydrothermal reaction method comprising steps of neutralizing a solution containing metal salts of barium ferrite composition with an alkali to eliminate by-products from the solution, subjecting the resulting solution to liquid-phase heating at 100° C. or more, and further subjecting it to successive washing, drying and grinding operations, thereby producing a barium ferrite crystalline powder.

(3) A coprecipitation method comprising steps of neutralizing a solution containing metal salts of barium ferrite composition with an alkali to eliminate by-products from the solution, drying the resulting solution, and subjecting the residue to treatment at a temperature of 1100° C. or below and then to a grinding operation, thereby producing a barium ferrite crystalline powder.

In the invention, ferromagnetic hexagonal barium ferrite powders are preferred in particular.

III. Non-Magnetic Powder

In the magnetic recording medium of the present invention, the underlayer comprising a binder and a non-magnetic powder is provided on a support.

The non-magnetic powder used for the underlayer may be made of any of inorganic and organic materials. Carbon black may also be used as the non-magnetic powder. Examples of the inorganic material for the non-magnetic powder include metals, metal oxides, metal carbonates, metal sulfates, metal nitrides, metal carbides and metal sulfides. More specifically, titanium oxides such as titanium dioxide, cerium oxide, tin oxide, tungsten oxide, ZnO, $ZrO_2$, $SiO_2$, $Cr_2O_3$, aluminium oxide having an α-alumina content of 90 to 100%, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$ and silicon carbide can be used alone or as a combination of two or more thereof. The α-iron oxide and titanium oxide are preferably used.

The non-magnetic powder may have any of acicular, spherical, polyhedral and tabular shapes.

A crystallite size of the non-magnetic powder is preferably from 0.004 to 1 μm, more preferably from 0.04 to 0.1 μm. When the non-magnetic powder has a crystallite size smaller than 0.004 μm, it tends to be difficult to disperse; while, when it has a crystallite size greater than 1 μm, the layer tends to have a rough surface.

An average particle size of the non-magnetic powder is preferably from 0.005 to 2 μm. If desired, two or more non-magnetic powders differing in average particle size may be used for broadening particle size distribution. Alternatively, independent use of a non-magnetic powder having a broad size distribution can provide similar effects. In particular, the average particle size ranging from 0.01 to 0.2 μm is preferred. When the non-magnetic powder has an average particle size smaller than 0.005 μm, such a powder tends to be difficult to disperse; while, when the average particle size is greater than 2 μm, the layer tends to have a rough surface.

A specific surface area of the non-magnetic powder is ordinarily in the range of 1 to 100 m²/g, preferably 5 to 70 m²/g and more preferably 10 to 65 m²/g. When non-magnetic powder having the specific surface area smaller than 1 m²/g is used, such a powder tends to cause increase in surface roughness. On the other hand, when non-magnetic powder having the specific surface area greater than 100 m²/g is used, there tends to occur great difficulty in dispersing such a powder, e.g., even using the desired amount of binder.

The oil absorptive capacity using dibutyl phthalate (DBP) is ordinarily in the range of 5 to 100 ml/100 g, preferably 10 to 80 ml/100 g, and more preferably 20 to 60 ml/100 g. The specific gravity is from 1 to 12, preferably from 3 to 6.

The tap density is ordinarily from 0.05 to 2 g/ml, preferably from 0.2 to 0.5 g/ml. When non-magnetic powder having the tap density lower than 0.05 g/ml is used, such a powder is liable to scatter and difficult to handle; while, when the tap density is higher than 2 g/ml, such a powder is apt to adhere to an apparatus and make it difficult to perform operations.

A pH of the non-magnetic powder is preferably in the range of 2 to 11, more preferably 6 to 9. When the pH of non-magnetic powder is lower than 2, the powder tends to have a great friction coefficient under high temperature and high humidity conditions. When the pH of non-magnetic powder is higher than 11, on the other hand, there tends to occur a decrease in an amount of fatty acid liberated and result in an increase of friction coefficient.

A water content of the non-magnetic powder used in the underlayer is ordinarily in the range of 0.1 to 5% by weight, preferably 0.2 to 3% by weight, more preferably 0.3 to 1.5% by weight. When the non-magnetic powder has a water content lower than 0.1% by weight, such a powder tends to be difficult to disperse. On the other hand, when the water content of powder is higher than 5% by weight, the viscosity of a coating composition in which such a powder is dispersed is liable to be unstable.

An ignition loss of the non-magnetic powder is preferably at most 20% by weight. The non-magnetic powder having a light loss on ignition is preferable.

When the non-magnetic powder used is an inorganic powder, its Mohs hardness is preferably from 4 to 10. When the Mohs hardness of non-magnetic powder used is below 4, the underlayer containing such a powder tends to fail in ensuring durability.

An amount of stearic acid adsorbed to the non-magnetic powder used is preferably in the range of 1 to 20 $\mu$mol/m$^2$, more preferably 2 to 15 $\mu$mol/m$^2$.

Further, a wetting heat of the non-magnetic powder in 25° C. water is preferably in the range of 200 to 600 erg/cm$^2$ (200 to 600 mJ/m$^2$). Besides using water, it is also possible to use a solvent so far as the non-magnetic powder used has such a range of wetting heat in the solvent. A quantity of water present on the powder surface at 100 to 400° C. is ordinarily from 1 to 10 molecules per 100 Å. It is advantageous to use a non-magnetic powder the pH of which is in the range of 3 to 9 at the isoelectric point in water.

Furthermore, it is advantageous that $Al_2O_3$, $SiO_2$, $TiO_2$, $ZrO_2$, $SnO_2$, $Sb_2O_3$ or ZnO is present on the surface of non-magnetic powder by surface treatment as described above. Of those oxides, $Al_2O_3$, $SiO_2$, $TiO_2$ and $ZrO_2$, especially $Al_2O_3$, $SiO_2$ and $ZrO_2$, are preferred from the viewpoint of dispersibility. These oxides may be used in combination or independently. Such a surface treatment layer can be formed using a method suitable for the purpose. For instance, it may be formed by coprecipitation of the desired oxides, or by providing an alumina layer first and then silica layer, or vise versa. In addition, the surface treatment layer formed may be porous in some cases, but it is ordinarily preferred that the layer be uniform and dense.

Examples of the non-magnetic powder for use in the underlayer of the present invention include Nanotite produced by Showa Denko K. K., HIT-100 and ZA-G1 produced by Sumitomo Chemical Co., Ltd., DPN-250, DPN-250BX, DPN-245, DPN-270BX, DPB-550BX and DPB-550RX produced by Toda Kogyo Corp, TTO-51B, TTO-55A, TTO-55B, TTO-55C, TTO-55S, TTO-55D, SN-100 and MJ-7 produced as titanium oxide by Ishihara Sangyo, E270, E271 and E300 produced as α-iron oxide by Ishihara Sangyo, STT-4D, STT-30D, STT-30 and STT-65C produced by Titan Kogyo, T-100S, MT-100T, MT-150W, MT-500B, MT-600B, MT-100F and MT-500HD produced by Teika, FINEX-24, BF-1, BF-10, BF-20AND ST-M produced by Sakai Chemical Industry Co., Ltd., DEFIC-Y and DEFIC-R produced by Dowa Mining Co., Ltd., AS2BM and TiO2P25 produced by Nippon Aerosil Corporated, 100A and 500A produced by Ube Industries Ltd., and Y-LOP and burned Y-LOP produced by Titan Kogyo. Of the non-magnetic powder, titanium dioxide and α-iron oxide are particularly preferred.

In the underlayer, carbon black can be mixed together with a non-magnetic powder as described above. By doing so, the underlayer can have lowered surface electric resistance (Rs), diminished light transmittance and the desired micro Vickers hardness.

The micro Vickers hardness of the underlayer is ordinarily adjusted to the range of 25 to 60 kg/mm$^2$ (245 to 588 MPa), preferably to the range of 30 to 50 kg/mm$^2$ (294 to 490 MPa) for control of head touch. The micro Vickers hardness can be determined using a thin-film hardness meter (HMA-400, made by Nippon Electric Co.) wherein a triangular pyramid-shaped diamond stylus having an edge angle of 80 degrees and a tip radius of 0.1 $\mu$m is used as the top of a pressure element. The light transmission is ordinarily adjusted so that the infrared ray absorption by the underlayer at a wavelength of about 900 nm becomes 3% or below. In the case of a VHS-format magnetic tape, for instance, the light transmission is standardized at 0.8% or below. In order to meet such a standardization, furnace black for rubber use, thermal black for rubber use, carbon black for color and acetylene black can be utilized.

The carbon black used in the underlayer ordinarily has its specific surface area in the range of 100 to 500 m$^2$/g, preferably 150 to 400 m$^2$/g, and its DBP absorptive capacity in the range of 20 to 400 ml/100 g, preferably 30 to 200 ml. The average particle size of carbon black used is from 5 to 80 nm, preferably from 10 to 50 nm, more preferably from 10 to 40 nm. Further, it is preferred that the pH, water content and tap density of the carbon black used are from 2 to 10, from 0.1 to 10% and from 0.1 to 1 g/ml, respectively.

Examples of carbon black for use in the invention include BLACKPEARLS 2000, 1300, 1000, 900, 800, 880 and 700, and VULCAN XC-72 produced by Cabot Corporation, #3050B, 3150B, 3250B, #3750B, #3950B, #950, #650B, #970B, #850B and MA-600 produced by Mitsubishi Chemical Corporation, CONDUCTEX SC, RAVEN 8800, 8000, 7000, 5750, 5250, 3500, 2100, 2000, 1800, 1500, 1255 and 1250 produced by Columbian Chemicals Company, and KETJENBLACK EC produced by Akzo Co. Carbon black may be surface-treated with a dispersing agent, a resin may be grafted on carbon black, or carbon black surface may be partly converted into graphite. Also, carbon black may be dispersed into a binder before it is added to a coating composition. The carbon black can be used in a proportion lower than 50% by weight to the inorganic powder as described above, and that lower than 40% to the total weight of the underlayer. The carbon black of various types as described above may be used alone or as a combination of two or more thereof. Details of various types of the carbon black for use in the underlayer of the present invention can be referred to, e.g., *Carbon Black Binran* (which may be translated into the English title "Handbook of Carbon Black"), compiled by Carbon Black Association.

To the underlayer, organic powder can also be added, if desired. Examples of the organic powder which can be added include acrylic-styrene resin powder, benzoguanamine resin powder, melamine resin powder and phthalocyanine pigment. Further, polyolefin resin powder, polyester resin powder, polyamide resin powder, polyimide resin powder and polyfluoroethylene resin powder may be used.

IV. Other Additives

For providing dispersing effect, lubricating effect, antistatic effect and plasticizing effect to the magnetic recording medium of the present invention, additives may be added to the magnetic layer or the underlayer. Examples of the additives include, for example, molybdenum disulfide, tungsten disulfide, graphite, boron nitride, fluorinated graphite, silicone oil, polar group-containing silicone, fatty acid-modified silicone, fluorine-containing silicone, fluorine-containing alcohol, fluorine-containing ester, polyolefin, polyglycol, polyphenyl ether, benzene ring-containing organic phosphonic acids (e.g., phenylphosphonic acid, benzylphosphonic acid, phenetylphosphonic acid, α-methylbenzylphosphonic acid, 1-methyl-1-phenetylphosphonic acid, diphenylmethylphosphonic acid, biphenylphosphonic acid, benzylphenylphosphonic acid, α-cumylphosphonic acid, toluylphoshonic acid, xylylphosphonic acid, ethylphenylphosphonic acid, cumenylphosphonic acid, propylphenylphosphonic acid, butylphenylphosphonic acid, heptylphenylphosphonic acid, octylphenylphosphonic acid, nonylphenylphosphonic acid) and alkali metal salts thereof, alkylphosphonic acids (e.g., octylphosphonic acid, 2-ethylhexylphosphonic acid, isooctylphosphonic acid, (iso)nonylphosphonic acid, (iso)decylphosphonic acid, (iso)undecylphosphonic acid, (iso)dodecylphosphonic acid, (iso)hexadecylphosphonic acid, (iso)octadecylphosphonic acid, (iso)eicosylphosphonic acid) and alkali metal salts thereof, aromatic phosphates (e.g., phenyl phosphate, benzyl phosphate, phenetyl phosphate, α-methylbenzyl phosphate, 1-methyl-1-phenetyl phosphate, diphenylmethyl phosphate, diphenyl phosphate, benzylphenyl phosophate, α-cumyl phosphate, toluyl phosphate, xylyl phosphate, ethylphenyl phosphate, cumenyl phosphate, propylphenyl phosphate, butylphenyl phosphate, heptylphenyl phosphate, octylphenyl phosphate, nonylphenyl phosphate) and alkali metal salts thereof, alkyl phosphates (such as octyl phosphate, 2-ethylhexyl phosphate, isooctyl phosphate, (iso)nonyl phosphate, (iso)decyl phosphate, (iso)undecyl phosphate, (iso)dodecyl phosphate, (iso)hexadecyl phosphate, (iso)octadecyl phosphate, (iso)eicosyl phosphate) and alkali metal salts thereof, alkyl sulfonates and alkali metal salts thereof, fluorine-containing alkyl sulfates and alkali metal salts thereof, monobasic fatty acids containing 10 to 24 carbon atoms which may contain unsaturated bonds or branched chains (e.g., lauric acid, myristic acid, palmitic acid, stearic acid, behenic acid, oleic acid, linolic acid, linolenic acid, elaidic acid, erucic acid) and metal salts thereof, mono-, di- or polyfatty acid esters produced by reaction of 10–24C saturated or unsaturated, straight-chain or branched monobasic fatty acids with 2–22C saturated or unsaturated, straight-chain or branched monohydric to hexahydric alcohols, 12–22C saturated or unsaturated, straight-chain or branched alkoxyalcohols or monoalkyl ethers of polyalkylene oxide (e.g., butyl stearate, octyl stearate, amyl stearate, isooctyl stearate, octyl myristate, butyl laurate, butoxyethyl stearate, anhydrosorbitane monostearate, anhydrosorbitane distearate, anhydrosorbitane tristearate), 2–22C fatty acid amides, and 8–22C aliphatic amines. For hydrogen atoms of alkyl, aryl and aralkyl groups present in the above-recited compounds, nitro groups, halogen atoms (e.g., F, Cl, Br) or halogenated hydrocarbon groups (e.g., $CF_3$, $CCl_3$, $CBr_3$) may be substituted.

Further, nonionic surfactants of alkylene oxide type, glycerin type, glycidol type and alkylphenol-ethylene oxide adducts, cationic surfactants such as cyclic amines, ester amides, quaternary ammonium salts, hydantoin derivatives, heterocyclic compounds, phosphonium compounds and sulfonium compounds, anionic surfactants containing acid groups such as carboxyl, sulfo and sulfate groups, and amphoteric surfactants such as amino acids, aminosulfonic acids, sulfuric or phosphoric acid esters of aminoalcohols, and alkyl betaine-type can be used as the additives. Details of these surfactants are described in *Kaimen Kasseizai Binran* (which may be translated into the English title "*Handbook of Surfactants*"), published by Sangyo Tosho K. K. The lubricants and antistatic agents are not always required to be pure, but may contain impurities, such as isomers, unreacted materials, by-products, decomposed matter and oxides. The allowable level of contamination with such impurities is below 30% by weight, preferably below 10% by weight.

Examples of such a lubricant and an antistatic agent include NAA-102, caster oil-hydrogenated fatty acid, NAA-42, Cation SA, Nimean L-201, Nonion E-208, Anon BF and Anon LG produced by NOF Corporation, FAL-205 and FAL-123 produced by Takemoto Oil & Fat Co., Ltd., ENUJELB OL produced by New Japan Chemical Co., Ltd., TA-3 produced by Shin-Etsu Chemical, Armide P produced by Lion Armargh Co., Duomine TDO produced by Lion Corp., BA-41G produced by Nisshin Oil Mills, Ltd., and Prophan 2012E, Newpole PE61 and Ionet MS-400 produced by Sanyo Chemical Industries, Ltd.

In the invention, the species and the amounts of dispersing agent, lubricant and surfactant added to the underlayer can be different from those added to the magnetic layer, if desired. For instance, dispersing agents have adsorbing or bonding properties attributable to their polar groups. The dispersing agents added to the magnetic layer are mainly adsorbed or bonded to the ferromagnetic powder surface via their polar groups, while those added to the underlayer are mainly adsorbed or bonded to the nonmagnetic powder surface via their polar groups. The once adsorbed dispersing agents are believed to be hard to desorb from the metal or metal compound surface. Therefore, the ferromagnetic or non-magnetic powder surface is in such a state that it is covered with alkyl groups or aromatic groups. As a result, the ferromagnetic or non-magnetic powder is improved in affinity to the binder resin component, and in dispersion stability. Since lubricants are present in a liberated state, it is thought that their oozing from the layer surface can be controlled by using fatty acids having different melting points or esters having different boiling points or polarities in the underlayer and the magnetic layer respectively, the coating stability is enhanced by controlled the amount of surfactants added, and the lubricating effect is elevated by adding a greater amount of lubricant to the underlayer. All or part of additives used in the invention may be added in any process of the preparation of a coating composition for the magnetic layer or the underlayer. For instance, there are various cases wherein the additives are mixed with a ferromagnetic powder prior to the kneading process, they are added during the process of kneading a ferromagnetic powder, a binder and a solvent, they are added in the process of dispersion, they are added after the dispersion process, and they are added just before coating.

V. Support

A coating solution prepared using the materials as described above is coated on a support to form an underlayer or a magnetic layer.

Any of known supports are usable in the invention, with examples including biaxially stretched polyethylene terephthalate, polyethylene naphthalate, polyamide, polyimide, polyamideimide, aromatic polyamide and polybenzoxazole. Of these polymers, polyethylene terephthalate, polyethylene naphthalate and aromatic polyamides are preferred. These support materials may undergo in advance corona discharge, plasma treatment, adhesion-increasing treatment and heat treatment. Further, the support used in the invention has such a very smooth surface that the center-plane average surface roughness determined by Mirau method is from 0.1 to 20 nm, preferably from 1 to 10 nm, at the cut-off value of 0.25 mm. Furthermore, it is preferred that the support has no coarse projections measuring 1 μm or more in height as well as a low value of the center-line average surface roughness.

The arithmetic mean roughness of the support used is preferably 0.1 μm or below in terms of Ra value (JIS B0660-1998, ISO 4287-1997). When the support used has its arithmetic mean roughness in such a range, the resulting magnetic recording medium can be reduced in noise.

A thickness of the support used is preferably from 3 to 80 μm.

VI. Backing Layer and Subbing Layer

The support for use in the present invention may have a backing layer on the side where no magnetic layer is provided. The backing layer is a layer formed by coating on the back of the support a coating composition containing particulate ingredients, such as an abrasive and an antistatic agent, and a binder dispersed in an organic solvent. As the particulate ingredients, various kinds of inorganic pigments and carbon black can be used. As the binder, nitrocellulose, phenoxy resin, vinyl chloride resin and polyurethane resin can be used alone or as a mixture of two or more thereof. The support may have an adhesive layer on each of the sides to be coated with the magnetic coating composition and the backing layer-forming coating composition respectively.

Further, the magnetic recording medium of the invention may have a subbing layer. By providing a subbing layer, adhesiveness between the support and the magnetic layer or the underlayer can be enhanced. The subbing layer is formed using a solvent-soluble polyester resin, and the thickness thereof is adjusted to 0.5 $\mu$m or below.

VII. Production Method

The magnetic recording medium of the present invention is produced, e.g., by coating an underlayer coating composition and a magnetic layer coating composition on a support in travelling so that each layer has the desired thickness. A plurality of magnetic layer coating compositions may be coated successively or simultaneously into multiple layers, and an underlayer coating composition and a magnetic layer coating composition may be coated successively or simultaneously into double layers. Examples of a coating machine used for coating magnetic layer coating composition or underlayer coating composition include an air doctor coater, a blade coater, a rod coater, an extrusion coater, an air knife coater, a squeegee coater, a dip coater, a reverse roll coater, a transfer roll coater, a gravure coater, a kiss coater, a cast coater, a spray coater and a spin coater. For details of the coating machines, reference can be made to Saishin Coating Gijutu (*which may be translated into the English title "Latest Coating Technology"*), published by Kabushiki-gaisha Sogo Gijutu Center (May 31, 1983).

Examples of a coating machine and method applicable to production of the magnetic recording medium are described below:

(1) A lower layer is formed first using a coating machine usually utilized for coating magnetic layer coating solution, such as a gravure, roll, blade or extrusion coater and, while the lower layer is in an undried condition, an upper layer is coated using a pressurized support type extrusion coating machine as disclosed in JP-B-1-46186 (the term "JP-B" as used herein means an "examined Japanese patent publication), JP-A-60-238179 and JP-A-2-265672.

(2) An upper layer and a lower layer are coated almost simultaneously using a coating head having two slits for passage of coating solution as disclosed in JP-A-63-88080, JP-A-2-17971 and JP-A-2-265672.

(3) An upper layer and a lower layer are coated almost simultaneously using a backup roll-attached extrusion coating machine as disclosed in JP-A-2-174965.

A magnetic layer thickness of the magnetic recording medium of the present invention is optimized depending on the saturated magnetization intensity of ahead to be used, the head gap length and the recording signal band, and specifically it is in the range of 0.01 to 0.5 $\mu$m. When the magnetic layer contains a ferromagnetic metal powder, the magnetic layer thickness is preferably from 0.01 to 0.1 $\mu$m. When the magnetic layer contains a ferromagnetic hexagonal ferrite powder, the magnetic layer thickness is preferably from 0.01 to 0.2 $\mu$m. The magnetic layer may be divided into two or more layers having different magnetic characteristics. In this case, known constitutions concerning multiple magnetic layers are applicable. When a plurality of magnetic layers are provided, the term "magnetic layer thickness" means a thickness of each individual magnetic layer.

For coating such a very thin magnetic layer consistently, it is desirable that the magnetic layer be provided on a support via an underlayer containing an inorganic powder in accordance with a wet-on-wet coating method.

When the magnetic recording medium is a magnetic tape, the coating layer formed from a magnetic layer coating composition is subjected to magnetic orientation treatment with cobalt magnets or solenoid so that the ferromagnetic particles contained therein are oriented in the length direction. When the magnetic recording medium is a magnetic disk, on the other hand, the magnetic disk can sometimes have sufficiently isotropic orientation without undergoing any orientation treatment, but it is preferable to let the magnetic disk have isotropic orientation by applying thereto an alternating magnetic field with solenoid or a known device for random orientations such as cobalt magnets aligned in a staggered format. As to the isotropic orientation, in-plane two-dimensionally random orientations are generally preferable in the case of fine ferromagnetic metal powder. However, the fine ferromagnetic metal powder may have a vertically magnetized component and be oriented randomly in three dimensions. The ferromagnetic hexagonal ferrite particles are generally apt to have random orientations not only in plane but also in vertical direction, or three-dimensional random orientations, but it is possible to let them have in-plane two-dimensionally random orientations. Further, it is possible to impart magnetic characteristics isotropic in the circumferential direction by aligning ferromagnetic hexagonal ferrite particles in vertical direction in accordance with a known method, e.g., using different poles-opposed magnets. In particular, the vertical orientation is desirable for high-density recording. The circumferential orientation may also be provided by spin-coating.

It is preferred that the drying position on the coating layer is controlled by properly adjusting the temperature and volume of drying air and the coating speed. Specifically, the coating speed is preferably chosen from the range of 20 to 1,000 m/min, and the temperature of drying air is preferably 60° C. or above. In addition, the coating layer may undergo appropriate pre-drying treatment before it enters into the magnet zone.

After drying, the coating layer is subjected to calendering treatment. For instance, supercalender rolls are utilized in the calendering treatment. By the calendering treatment, pores produced in the coating layer by removal of the solvent upon drying are crushed, and the packing degree of ferromagnetic powder in the magnetic layer is enhanced. As a result, a magnetic recording medium having high electro-magnetic conversion efficiency can be obtained. As the calendering rolls, heat-resistant plastic rolls such as epoxy resin-, polyimide-, polyamide- or polyamideimide-made rolls can be used. In addition, metal rolls may be used for calendering. It is preferred that the surface of the magnetic recording medium of the invention has such a very high smoothness that the center-plane average surface roughness determined by Mirau method is from 0.1 to 4 nm, more preferably from 1 to 3 nm, at the cut-off value of 0.25 mm. In order to acquire such a high smooth surface, e.g., the magnetic layer formed from the specific ferromagnetic powder and binder as described above undergoes calendering as above. As to the calendering conditions, the calender roll temperature is in the range of 60 to 100° C., preferably 70 to 100° C., particularly preferably 80 to 100° C., and the pressure applied is in the range of 100 to 500 kg/cm (98 to 490 kN/m), preferably 200 to 450 kg/cm (196 to 441 kN/m), particularly preferably 300 to 400 kg/cm (294 to 392 kN/m). The thus-produced magnetic recording medium can be cut to the desired size using a cutter, and becomes available for use.

Now, the present invention will be illustrated in more detail by reference to the following examples. However, the invention should not be construed as being limited to these examples. Unless otherwise noted, all "parts" in the examples are by weight.

SYNTHESIS EXAMPLE 1

Synthesis of (Meth)acrylate Copolymer A

In a polymerization vessel equipped with a stirrer, a condenser, a thermometer and a nitrogen-gas intake, 360 parts of deionized water, 5 parts of potassium persulfate and 1.6 parts of sodium carbonate were placed. The atmosphere in the vessel was replaced with nitrogen gas, and then the contents were heated up to 57° C. Separately, 390 parts of deionized water, 350 parts of methyl methacrylate, 120 parts of benzyl methacrylate, 20 parts of N-vinylpyrrolidone, 10 parts of 2-hydroxyethyl methacrylate and 10 parts of sodium laurylsulfate were mixed and emulsified with a homomixer. The emulsion thus prepared was dropwise added uniformly into the polymerization vessel described above over a period of 8 hours, and the resulting mixture further proceeded with reaction for 2 hours at 57° C. to complete polymerization. Thereafter, 500 parts of methanol and 50 parts of sodium sulfate were added to the reaction mixture, thereby depositing a polymer. The polymer deposited was washed with each 5,000 parts of methanol two times and further with each 5,000 parts of deionized water 4 times, filtered off, and then dried. Thus, (Meth)acrylate Copolymer A was obtained.

The content of sodium sulfonate groups in Copolymer A was $6.2 \times 10^{-5}$ eq/g, and the content of hydroxyl groups therein was $12.9 \times 10^{-5}$ eq/g. The (Meth)acrylate Copolymer A had a number average molecular weight (Mn) of 38,000.

SYNTHESIS EXAMPLES 2 TO 18

Synthesis of (Meth)acrylate Copolymers B to S (Meth)acrylate Copolymers B to S were synthesized in the same manner as in Synthesis Example 1, except that the species and the amount ratio (wt %) of monomers used for copolymerization were changed as shown in Table 1 and Table 2, respectively.

SYNTHESIS EXAMPLE 19

Synthesis of (Meth)acrylate Copolymer T

In a polymerization vessel equipped with a stirrer, a condenser, a thermometer and a nitrogen-gas intake, 360 parts of deionized water, 2 parts of t-butyl hydroperoxide and 1 parts of sodium sulfite were placed. The atmosphere in the vessel was replaced with nitrogen gas, and then the contents were heated up to 57° C. Separately, 390 parts of deionized water, 320 parts of methyl methacrylate, 125 parts of benzyl methacrylate, 40 parts of N-vinylpyrrolidone, 10 parts of 2-hydroxyethyl methacrylate, 10 parts of allyl glycidyl ether and 10 parts of sodium laurylsulfate were mixed and emulsified with a homomixer. The emulsion thus prepared was dropwise added uniformly into the polymerization vessel described above over a period of 8 hours, and the resulting mixture further proceeded with reaction for 2 hours at 57° C. to complete polymerization. Thereafter, 50 parts of sodium sulfate, 25 parts of tetrabutylammonium bromide and 50 parts of ethylene glycol dimethyl ether were added dropwise to the reaction mixture, and stirred for 6 hours at 70° C., thereby proceeding with reaction. After conclusion of the reaction, the matter deposited was washed with each 5,000 parts of deionized water 4 times, filtered off, and then dried. Thus, (Meth)acrylate Copolymer T was obtained.

The content of sodium sulfonate groups in Copolymer T was $7.6 \times 10^{-5}$ eq/g, and the content of hydroxyl groups therein was $12.7 \times^{-5}$ eq/g.

SYNTHESIS EXAMPLE 20

Synthesis of (Meth)acrylate Copolymer U

In a polymerization vessel equipped with a stirrer, a condenser, a thermometer and a nitrogen-gas intake, 360 parts of deionized water, 5 parts of potassium persulfate and 1.6 parts of sodium carbonate were placed. The atmosphere in the vessel was replaced with nitrogen gas, and then the contents were heated up to 57° C. Separately, 390 parts of deionized water, 320 parts of methyl methacrylate, 125 parts of benzyl methacrylate, 40 parts of N-vinylpyrrolidone, 10 parts of 2-hydroxyethyl methacrylate, 5 parts of vinylsulfonic acid and 10 parts of sodium laurylsulfate were mixed and emulsified with a homomixer. The emulsion thus prepared was dropwise added uniformly into the polymerization vessel described above over a period of 8 hours, and the resulting mixture further proceeded with reaction for 2 hours at 57° C. to complete polymerization. Thereafter, 500 parts of methanol and 50 parts of sodium sulfate were added to there action mixture, there by depositing a polymer. The polymer deposited was washed with each 5,000 parts of methanol two times and further with each 5,000 parts of deionized water for 4 times, filtered off, and then dried. Thus, (Meth)acrylate Copolymer U was obtained.

The content of sodium sulfonate groups in Copolymer U was $6.4 \times 10^{-5}$ eq/g, and the content of hydroxyl groups therein was $12.7 \times 10^{-5}$ eq/g.

TABLE 1

| Synthesis Example No. | | 1 | 2 | 3 | 4 | 5 | 6 | 7 | 8 | 9 | 10 | 11 | 12 |
|---|---|---|---|---|---|---|---|---|---|---|---|---|---|
| Reference letter to Copolymer | | A | B | C | D | E | F | g | h | I | j | K | l |
| Monomer units | | Monomer-Unit Composition (wt %) of Copolymer | | | | | | | | | | | |
| Alkyl (meth)acryl-ate units | methyl methacrylate butyl methacrylate | 70 | 70 | 60 | 50 | 50 | 50 | 80 | 10 | 40 | 75 | 35 | 80 |
| Benzene ring-containing (meth)acryl-ate units | benzyl methacrylate benzyl acrylate Phenoxyethyl (meth)acrylate | 24 | 20 | 30 | 40 | 25 | 10 | 10 | 80 | 50 | 0 | 10 | 18 |

TABLE 1-continued

| Synthesis Example No. | | 1 | 2 | 3 | 4 | 5 | 6 | 7 | 8 | 9 | 10 | 11 | 12 |
|---|---|---|---|---|---|---|---|---|---|---|---|---|---|
| Reference letter to Copolymer | | A | B | C | D | E | F | g | h | I | j | K | l |
| Monomer units | | \multicolumn{12}{c}{Monomer-Unit Composition (wt %) of Copolymer} |
| Nitrogen-containing radical polymerizable monomer units | N-vinylpyrrolidone | 4 | 8 | 8 | 8 | 23 | 38 | 8 | 8 | 8 | 23 | 53 | 0 |
| | 2-vinylpyridine | | | | | | | | | | | | |
| | Diethylaminoethyl methacrylate | | | | | | | | | | | | |
| | N-methylolacryl-Amide | | | | | | | | | | | | |
| Other radical polymerizable monomer units | 2-hydroxyethyl methacrylate | 2 | 2 | 2 | 2 | 2 | 2 | 2 | 2 | 2 | 2 | 2 | 2 |
| | vinylsulfonic acid | | | | | | | | | | | | |
| | allyl glycidyl ether | | | | | | | | | | | | |
| Hydrophilic polar groups | —SO$_3$Na group introduction method | \multicolumn{12}{c}{Initiator} |
| | —SO$_3$Na content ($\times 10^{-5}$ eq/g) | 6.2 | 6.3 | 5.9 | 5.6 | 6.1 | 6.6 | 6.8 | 4.6 | 5.3 | 7.2 | 6.5 | 6.5 |
| | —OH group introduction method | \multicolumn{12}{c}{Copolymerization} |
| | —OH content ($\times 10^{-5}$ eq/g) | 12.9 | 13.2 | 12.4 | 11.6 | 12.6 | 13.7 | 14.1 | 9.5 | 11.0 | 14.9 | 13.5 | 13.4 |
| Number average molecular weight of (meth)acrylate copolymer (Mn) | | 38,000 | 40,000 | 37,000 | 36,000 | 39,000 | 40,000 | 42,000 | 36,000 | 35,000 | 38,000 | 39,000 | 40,000 | note: Small letters used as reference letter means that the copolymers produced are comparative polymers.

TABLE 2

| Synthesis Example No. | | 13 | 14 | 15 | 16 | 17 | 18 | 19 | 20 |
|---|---|---|---|---|---|---|---|---|---|
| Reference letter to Copolymer | | M | O | P | Q | R | S | T | U |
| Monomer units | | \multicolumn{8}{c}{Monomer-Unit Composition (wt %) of Copolymer} |
| Alkyl (meth)acrylate units | methyl methacrylate | | 65 | 65 | 65 | 65 | 71 | 63 | 64 |
| | butyl methacrylate | 65 | | | | | | | |
| Benzene ring-containing (meth)acrylate units | benzyl methacrylate | 25 | | | 25 | 25 | 25 | 25 | 25 |
| | benzyl acrylate | | 25 | | | | | | |
| | Phenoxyethyl (meth)acrylate | | | 25 | | | | | |
| Nitrogen-containing radical polymerizable monomer units | N-vinylpyrrolidone | 8 | 8 | 8 | | | | 8 | 8 |
| | 2-vinylpyridine | | | | 8 | | | | |
| | diethylaminoethyl methacrylate | | | | | 8 | | | |
| | N-methylolacrylamide | | | | | | 4 | | |
| Other radical polymerizable monomer units | 2-hydroxyethyl methacrylate | 2 | 2 | 2 | 2 | 2 | | 2 | 2 |
| | Vinylsulfonic acid | | | | | | | | 1 |
| | allyl glycidyl ether | | | | | | | 2 | |
| Hydrophilic polar groups | —SO$_3$Na group introduction method | \multicolumn{5}{c}{initiator} | after reaction | Copolymerization | |
| | —SO$_3$Na content ($\times 10^{-5}$ eq/g) | 5.0 | 6.3 | 5.8 | 6.2 | 5.8 | 6.2 | 7.6 | 6.4 |
| | —OH group introduction method | \multicolumn{8}{c}{Copolymerization} |
| | —OH content ($\times 10^{-5}$ eq/g) | 10.4 | 13.1 | 12.0 | 12.8 | 12.1 | 33.2 | 12.7 | 12.7 |
| Number average molecular weight of (meth)acrylate copolymer (Mn) | | 39,000 | 40,000 | 37,000 | 38,000 | 36,000 | 37,000 | 40,000 | 41,000 |

EXAMPLE 1

Preparation of Magnetic Layer Coating Composition

| | |
|---|---|
| Ferromagnetic acicular metal powder | 100 parts |
| Composition (Atomic ratio): Fe/Co/Al/Y = 68/20/7/5, | |
| Layer formed by surface treatment: Al$_2$O$_3$, Y$_2$O$_3$, | |
| Hc: 2,500 Oe (200 kA/m), Crystallite size: 14 nm, | |
| Average length: 0.08 μm, Average aspect ratio: 6, | |
| BET specific surface area: 46 m$^2$/g, σs: 150 A·m$^2$/kg | |
| (Meth)acrylate Copolymer A | 6 parts |
| Polyurethane resin | 12 parts |
| (UR8200: Polyurethane resin containing sulfonic acid groups, a product of Toyobo Co.) | |
| Phenylphosphonic acid | 3 parts |
| α-Al$_2$O$_3$ (average particle size: 0.15 μm) | 2 parts |
| Carbon black (average particle size: 20 nm) | 2 parts |
| Cyclohexanone | 110 parts |
| Methyl ethyl ketone | 100 parts |

-continued

| | |
|---|---|
| Toluene | 100 parts |
| Butyl stearate | 2 parts |
| Stearic acid | 1 parts |

Preparation of Underlayer Coating Composition

| | |
|---|---|
| Non-magnetic inorganic powder (α-iron oxide)<br>Layer formed by surface treatment: $Al_2O_3$, $SiO_2$,<br>Average length: 0.15 μm, Tap density: 0.8,<br>Average aspect ratio: 7, BET specific surface<br>area: 52 m$^2$/g, pH 8, DBP absorptive capacity:<br>33 ml/100 g | 85 parts |
| Carbon black<br>DBP absorptive capacity: 120 ml/100 g, pH 8,<br>BET specific surface area: 250 m$^2$/g,<br>Volatile matter: 1.5% | 20 parts |
| (Meth)acrylate Copolymer A | 6 parts |
| Polyurethane resin<br>(UR8200: Polyurethane resin containing sulfonic acid<br>groups, a product of Toyobo Co.) | 12 parts |
| Phenylphosphonic acid | 3 parts |
| α-$Al_2O_3$ (average particle size: 0.2 μm) | 1 parts |
| Cyclohexanone | 140 parts |
| Methyl ethyl ketone | 170 parts |
| Butyl stearate | 2 parts |
| Stearic acid | 1 parts |

The above-recited ingredients for the magnetic layer coating composition and the above-recited ingredients for the underlayer coating composition were each kneaded for 60 minutes with an open kneader, and then dispersed for 120 minutes with a sand mill. To each of the dispersions thus prepared, 6 parts of trifunctional low molecular weight polyisocyanate compound (Colonate 3041, trade name, a product of Nippon Polyurethane Industry Co., Ltd.) was added, and stirred for 20 minutes. The compositions thus treated were each passed through a filter having an average pore size of 1 μm, thereby preparing coating compositions for a magnetic layer and an underlayer respectively.

To a 6 μm-thick polyethylene terephthalate support having a center-plane average surface roughness of 5 nm, the underlayer coating composition was applied so as to form an underlayer having a thickness of 1.8 μm after drying. Immediately thereafter, the coating composition for magnetic layer was applied so as to form a magnetic layer having a thickness of 0.08 μm after drying. While both of the layers were in a wet condition, they were subjected to magnetic orientation treatment with magnets of 300 mT. After drying, the support coated with those two layers was subjected to calendering treatment by passing 7-nips, each nip consists of a pair of metal rolls alone under conditions that the speed was 100 m/min, the linear pressure was 300 kg/cm (294 kN/m) and the temperature was 90° C., and further to thermally curing treatment for 24 hours at 70° C. The thus produced magnetic material was slit into stripes having a width of 3.8 mm, thereby making magnetic tapes.

EXAMPLES 2 TO 17

In Examples 2 to 17, magnetic tapes were produced in the same manner as in Example 1, except that (Meth)acrylate Copolymer A was replaced by the (meth)acrylate copolymers shown in Table 3 respectively.

COMPARATIVE EXAMPLES 1 TO 5

In Comparative Examples 1 to 5, magnetic tapes were produced in the same manner as in Example 1, except that (Meth)acrylate Copolymer A and/or the ferromagnetic metal powder were replaced by the materials shown in Table 3 respectively.

EXAMPLE 18

Floppy disks were produced changing the magnetic substance from the ferromagnetic powder used in Example 1 into the powder illustrated below.

Preparation of Magnetic Layer Coating Composition

| | |
|---|---|
| Tabular particles of ferromagnetic<br>hexagonal ferrite<br>Composition: Ba/Fe/Co/Zn = 1/9.1/0.2/0.8 by mole<br>ratio, Hc: 2,450 Oe (195 kA/m), Average diameter of<br>tabular particles: 26 nm, Average tablature<br>ratio: 4, BET specific surface area: 50 m$^2$/g,<br>σs: 60 A · m$^2$/kg | 100 parts |
| (Meth)acrylate Copolymer A | 6 parts |
| Polyurethane resin<br>(UR8200: Polyurethane resin containing sulfonic acid<br>groups, a product of Toyobo Co.) | 12 parts |
| Phenylphosphonic acid | 3 parts |
| α-$Al_2O_3$ (average particle size: 0.15 μm) | 2 parts |
| Carbon black (average particle size: 20 nm) | 2 parts |
| Cyclohexanone | 110 parts |
| Methyl ethyl ketone | 100 parts |
| Toluene | 100 parts |
| Butyl stearate | 2 parts |
| Stearic acid | 1 parts |

A coating composition for magnetic layer was prepared using the ingredients recited above in the same manner as in Example 1.

To a 62 μm-thick polyethylene terephthalate support having a center-plane average surface roughness of 5 nm, the same underlayer coating composition as used in Example 1 was applied so as to form an underlayer having a thickness of 1.5 μm after drying. Immediately thereafter, the above-recited coating composition for magnetic layer was applied so to form a magnetic layer having a thickness of 0.12 μm after drying. While both of the layers were in a wet condition, they were treated so as to have random orientation by passing them through an apparatus alternately generating a magnetic field having an intensity of 25 mT and a frequency of 50 Hz and a magnetic filed having an intensity of 12 mT and a frequency of 50 Hz. After drying, the support coated with those two layers was subjected to calendering treatment by passing 7-nips, each nip consisting of a pair of metal rolls, under conditions that the temperature was 90° C. and the linear pressure was 300 kg/cm (294 kN/m), and then stamped into disks measuring 3.7 inches in diameter, followed by surface polishing treatment. Further, each of these disks was encased in a 3.7-inch Zip cartridge in which a liner was previously installed, and further to the cartridge were attached the intended electromechanical components. Thus, 3.5-inch floppy disks were produced.

EXAMPLES 19 TO 23

In Examples 19 to 23, floppy disks were produced in the same manner as in Example 18, except that (Meth)acrylate Copolymer A was replaced by those shown in Table 4 respectively.

COMPARATIVE EXAMPLES 6

In Comparative Example 6, floppy disks were produced in the same manner as in Example 18, except that (Meth)acrylate Copolymer A and the magnetic substance were replaced by those shown in Table 4.

[Measuring Methods]
Magnetic Characteristic (Hc)

Coercive force (Hc) measurements were carried out using a vibration sample magnetometry (VDM) (made by Toei Industry Co., Ltd.) under a condition that Hm was set at 10 kOe (800 kA/m)

Magnetic Layer Thickness

Each magnetic recording medium sample was cut along the length direction with a diamond cutter to take sections having a thickness of about 0.1 μm. Each section was observed under a transmission electron microscope of a magnification ranging from 10,000 to 100,000 times, preferably from 20,000 to 50,000 times, and a microscope photograph thereof was taken. From this photograph, a photo print having an A-4 or A-5 size was made. On the photo print, the magnetic layer surface and the interface between the magnetic layer and the underlayer, which was visually judged from a shape difference between the ferromagnetic powder and the non-magnetic powder, were each bordered with a black line. The spacing between these black lines was measured with an image processing device IBAS2 made by Zeiss A. G. When the sample photograph had a length of 21 cm, the measuring process was repeated 85 to 300 times. The average of data obtained therein was taken as a thickness of the magnetic layer.

Error Rates (in Initial Stage and After Storage)

Under 23° C. and 50% RH, signals were recorded on a magnetic tape sample by the 8–10 conversion PRI equalization method or on a magnetic disk sample by the (2, 7) RLL modulation method, and measured with a DDS drive. Further, these samples were stored for one week under 25° C. and 80% RH, and then examined for their error rates in the same way as described above.

TABLE 3

| | Magnetic Powder | | | | | | | | Magnetic | (Meth)acrylate | | Error rate | |
| | Average major axis μm | Crystallite size Å | Composition Co atomic % | Al | Y | Characteristics Hc kA/m | σs A·m²/kg | $S_{BET}$ m²/g | layer thickness μm | copolymer magnetic layer | Under- layer | initial stage ×10⁻⁵ | after storage ×10⁻⁵ |
|---|---|---|---|---|---|---|---|---|---|---|---|---|---|
| Example 1 | 0.08 | 140 | 20 | 7 | 5 | 200 | 150 | 46 | 0.08 | A | A | 0.04 | 0.05 |
| Example 2 | 0.08 | 140 | 20 | 7 | 5 | 200 | 150 | 46 | 0.08 | B | B | 0.03 | 0.04 |
| Example 3 | 0.08 | 140 | 20 | 7 | 5 | 200 | 150 | 46 | 0.08 | C | C | 0.02 | 0.03 |
| Example 4 | 0.08 | 140 | 20 | 7 | 5 | 200 | 150 | 46 | 0.08 | D | D | 0.03 | 0.05 |
| Example 5 | 0.08 | 140 | 20 | 7 | 5 | 200 | 150 | 46 | 0.08 | E | E | 0.05 | 0.07 |
| Example 6 | 0.08 | 140 | 20 | 7 | 5 | 200 | 150 | 46 | 0.08 | F | F | 0.06 | 0.08 |
| Example 7 | 0.08 | 140 | 20 | 7 | 5 | 200 | 150 | 46 | 0.08 | M | M | 0.04 | 0.05 |
| Example 8 | 0.08 | 140 | 20 | 7 | 5 | 200 | 150 | 46 | 0.08 | O | O | 0.03 | 0.04 |
| Example 9 | 0.08 | 140 | 20 | 7 | 5 | 200 | 150 | 46 | 0.08 | P | P | 0.03 | 0.05 |
| Example 10 | 0.08 | 140 | 20 | 7 | 5 | 200 | 150 | 46 | 0.08 | Q | Q | 0.04 | 0.06 |
| Example 11 | 0.08 | 140 | 20 | 7 | 5 | 200 | 150 | 46 | 0.08 | R | R | 0.05 | 0.07 |
| Example 12 | 0.08 | 140 | 20 | 7 | 5 | 200 | 150 | 46 | 0.08 | S | S | 0.06 | 0.08 |
| Example 13 | 0.08 | 140 | 20 | 7 | 5 | 200 | 150 | 46 | 0.08 | T | T | 0.04 | 0.06 |
| Example 14 | 0.08 | 140 | 20 | 7 | 5 | 200 | 150 | 46 | 0.08 | U | U | 0.05 | 0.07 |
| Compar. Ex. 1 | 0.08 | 140 | 20 | 7 | 5 | 200 | 150 | 46 | 0.08 | g | g | 0.3 | 0.36 |
| Example 15 | 0.08 | 140 | 20 | 7 | 5 | 200 | 150 | 46 | 0.08 | H | H | 0.05 | 0.08 |
| Example 16 | 0.08 | 140 | 20 | 7 | 5 | 200 | 150 | 46 | 0.08 | I | I | 0.03 | 0.05 |
| Compar. Ex. 2 | 0.08 | 140 | 20 | 7 | 5 | 200 | 150 | 46 | 0.08 | j | j | 0.5 | 0.77 |
| Example 17 | 0.08 | 140 | 20 | 7 | 5 | 200 | 150 | 46 | 0.08 | K | K | 0.05 | 0.08 |
| Compar. Ex. 3 | 0.08 | 140 | 20 | 7 | 5 | 200 | 150 | 46 | 0.08 | L | L | 0.5 | 1.27 |
| Compar. Ex. 4 | 0.12 | 140 | 20 | 7 | 5 | 200 | 150 | 46 | 0.08 | B | B | 1.2 | 1.4 |
| Compar. Ex. 5 | 0.1 | 200 | 20 | 7 | 5 | 200 | 150 | 46 | 0.08 | B | B | 2 | 2.2 |

TABLE 4

| | Magnetic Powder | | | | | | | | Magnetic | (Meth)acrylate | | Error rate | |
| | Average diameter of tabular particles nm | Composition Fe | Co | Zn | Characteristics Hc kA/m | σs A·m²/kg | $S_{BET}$ m²/g | layer thickness μm | copolymer Magnetic layer | Under- layer | Initial state ×10⁻⁵ | After storage ×10⁻⁵ |
|---|---|---|---|---|---|---|---|---|---|---|---|---|
| | | molar ratio (Ba = 1) | | | | | | | | | | |
| Example 18 | 26 | 9.1 | 0.2 | 0.8 | 195 | 60 | 50 | 0.12 | A | A | 0.4 | 0.55 |
| Example 19 | 26 | 9.1 | 0.2 | 0.8 | 195 | 60 | 50 | 0.12 | B | B | 0.3 | 0.45 |
| Example 20 | 26 | 9.1 | 0.2 | 0.8 | 195 | 60 | 50 | 0.12 | C | C | 0.3 | 0.45 |
| Example 21 | 26 | 9.1 | 0.2 | 0.8 | 195 | 60 | 50 | 0.12 | D | D | 0.45 | 0.7 |
| Example 22 | 26 | 9.1 | 0.2 | 0.8 | 195 | 60 | 50 | 0.12 | E | E | 0.55 | 0.8 |
| Example 23 | 26 | 9.1 | 0.2 | 0.8 | 195 | 60 | 50 | 0.12 | F | F | 0.65 | 0.9 |
| Compar. Example 6 | 50 | 9.1 | 0.2 | 0.8 | 195 | 60 | 50 | 0.12 | B | B | 4 | 4.2 |

As can be seen from Tables 3 and 4, the magnetic recording media according to the present invention were stable and had low error rates.

In accordance with the invention, the magnetic recording medium comprises an underlayer containing a non-magnetic powder provided on a support and provided on the underlayer a magnetic layer having a thickness up to 0.5 μm and containing a fine ferromagnetic metal powder having an average major axis of 0.1 μm or below or a fine ferromagnetic hexagonal ferrite powder having an average tabular diameter of 40 nm or below and as a binder a (meth)acrylate copolymer having hydrophilic polar groups and comprising benzene ring-containing (meth)acrylate units and nitrogen-containing radical polymerizable monomer units, if necessary, alkyl (meth)acrylate units. By having such a constitution, the magnetic recording medium of the present, invention can have improvements in surface smoothness, electromagnetic characteristics and abrasion resistance at the magnetic layer surface, thereby ensuring reduced head contamination, consistently low error rate and excellent running durability. Moreover, the magnetic recording medium can have greatly improved storage stability and hardly cause an error rate increase by storage.

What is claimed is:

1. A magnetic recording medium comprising:

a support;

an underlayer containing a non-magnetic powder and a binder; and at least one magnetic layer containing a binder and one of a ferromagnetic metal powder having an average major axis of 0.01 μm to 0.10 μm and a crystallite size of 80 Å to 180 Å and a ferromagnetic hexagonal ferrite powder having an average tabular diameter of 5 nm to 40 nm, wherein the magnetic layer has a thickness of 0.01 μm to 0.5 μm, and the binder in the magnetic layer comprises a (meth)acrylate copolymer having hydrophilic polar groups and comprising 0 to 75% by weight of alkyl (meth)acrylate units, 5 to 80% by weight of benzene ring-containing (meth)acrylate units and 1 to 75% by weight of nitrogen-containing radical polymerizable monomer units.

2. The magnetic recording medium according to claim 1, wherein the magnetic layer has a thickness of 0.01 μm to 0.1 μm when it contains the ferromagnetic metal powder.

3. The magnetic recording medium according to claim 1, wherein the magnetic layer has a thickness of 0.01 μm to 0.2 μm when it contains the ferromagnetic hexagonal ferrite powder.

4. The magnetic recording medium according to claim 1, wherein the ferromagnetic metal powder contains Fe as a main component, and further contains Co, Al and Y in amounts of 10 to 40 atomic %, 2 to 20 atomic % and 1 to 15 atomic % respectively based on the Fe, and ferromagnetic metal powder has a coercive force of 2,000 to 3,000 Oe (160 to 240 kA/m) and a saturated magnetic flux density of 150 to 300 mT.

5. The magnetic recording medium according to claim 1, wherein the ferromagnetic hexagonal ferrite powder is a hexagonal barium ferrite having a coercive force of 2,000 to 3,000 Oe (160 to 240 kA/m) and a saturated magnetic flux density of 150 to 300 mT.

6. The magnetic recording medium according to claim 1, wherein the binder in the underlayer comprises a (meth)acrylate copolymer having hydrophilic polar groups and comprising 0 to 75% by weight of alkyl (meth)acrylate units, 5 to 80% by weight of benzene ring-containing (meth)acrylate units and 1 to 75% by weight of nitrogen-containing radical polymerizable monomer units.

7. The magnetic recording medium according to claim 1, which is a magnetic disk or tape for recording digital signals, to be applied to a record-reproducing system equipped with an MR reproduction head.

8. The magnetic recording medium according to claim 1, wherein the (meth)acrylate copolymer having hydrophilic polar groups has a number average molecular weight of 1,000 to 300,000.

9. The magnetic recording medium according to claim 1, wherein the (meth)acrylate copolymer having hydrophilic polar groups has a number average molecular weight of 10,000 to 150,000.

10. The magnetic recording medium according to claim 1, wherein the binder in the magnetic layer further comprises a polyurethane resin.

11. The magnetic recording medium according to claim 1, wherein the non-magnetic powder in the underlayer comprises at least one of α-iron oxide and titanium oxide.

12. The magnetic recording medium according to claim 1, wherein the non-magnetic powder in the underlayer comprises carbon black.

* * * * *